US011533226B2

(12) United States Patent
Cobb

(10) Patent No.: US 11,533,226 B2
(45) Date of Patent: *Dec. 20, 2022

(54) APPLICATION SERVICE CONFIGURATION SYSTEM

(71) Applicant: Uber Technologies, Inc., San Francisco, CA (US)

(72) Inventor: Nicholas Cobb, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/147,111

(22) Filed: Jan. 12, 2021

(65) Prior Publication Data

US 2021/0135941 A1    May 6, 2021

Related U.S. Application Data

(63) Continuation of application No. 16/157,346, filed on Oct. 11, 2018, now Pat. No. 10,917,297, which is a
(Continued)

(51) Int. Cl.
*H04L 41/0816* (2022.01)
*H04L 43/0852* (2022.01)
(Continued)

(52) U.S. Cl.
CPC ........ *H04L 41/0816* (2013.01); *H04L 41/083* (2013.01); *H04L 41/142* (2013.01);
(Continued)

(58) Field of Classification Search
CPC ....... H04L 41/142; H04L 43/14; H04L 43/16; G06F 3/0446
See application file for complete search history.

(56) References Cited

U.S. PATENT DOCUMENTS 6,711,137 B1 * 3/2004 Klassen ................ H04L 41/142
370/252
7,370,336 B2   5/2008 Husain
(Continued)

FOREIGN PATENT DOCUMENTS

CN    103577306    2/2014
JP    2006-065857    3/2006
(Continued)

OTHER PUBLICATIONS

IPRP in PCT/US2019/058526 dated Jun. 24, 2021.
(Continued)

*Primary Examiner* — Barbara B Anyan
(74) *Attorney, Agent, or Firm* — Mahamedi IP Law LLP

(57) ABSTRACT

A computing system implementing an application service can receive network data from computing devices of clients of the application service. The system can determine, from the network data, that a network latency for a subset of the computing devices crosses above a latency threshold. Based on determining that the subset of computing devices utilize a common network service provider, the system can transmit a set of configuration signals to the subset of computing devices, which modify a set of default application configurations of the designated application to compensate for the network latency.

20 Claims, 7 Drawing Sheets

Related U.S. Application Data continuation of application No. 14/881,502, filed on Oct. 13, 2015, now Pat. No. 10,158,528.

(51) Int. Cl.

| | | |
|---|---|---|
| *H04L 41/083* | (2022.01) | |
| *H04L 41/5025* | (2022.01) | |
| *H04L 41/142* | (2022.01) | |
| *H04L 43/00* | (2022.01) | |
| *H04L 43/16* | (2022.01) | |
| *H04W 4/021* | (2018.01) | |
| *H04L 43/08* | (2022.01) | |
| *H04L 45/00* | (2022.01) | |
| *G06F 3/038* | (2013.01) | |
| *H04L 67/50* | (2022.01) | |

(52) U.S. Cl.
CPC ...... *H04L 41/5025* (2013.01); *H04L 43/0852* (2013.01); *H04L 43/14* (2013.01); *H04L 43/16* (2013.01); *H04W 4/021* (2013.01); *G06F 3/038* (2013.01); *H04L 43/08* (2013.01); *H04L 45/70* (2013.01); *H04L 67/535* (2022.05)

(56) References Cited

U.S. PATENT DOCUMENTS

| | | | |
|---|---|---|---|
| 7,676,570 B2 | 3/2010 | Levy | |
| 7,948,906 B1 | 5/2011 | Patel | |
| 9,887,914 B2* | 2/2018 | Bergman | ............... H04L 43/16 |
| 9,971,618 B2 | 5/2018 | Lagergren | |
| 10,101,910 B1 | 10/2018 | Karpanen | |
| 2003/0182411 A1 | 9/2003 | Wang | |
| 2004/0060044 A1 | 3/2004 | Das et al. | |
| 2004/0268078 A1 | 12/2004 | Hassan | |
| 2005/0246701 A1 | 11/2005 | Kanapathipillai | |
| 2006/0026270 A1 | 2/2006 | Sadovsky | |
| 2006/0059023 A1 | 3/2006 | Mashinsky | |
| 2006/0156140 A1 | 7/2006 | Van Haegendoren | |
| 2007/0006208 A1 | 1/2007 | Nguyen | |
| 2007/0136402 A1 | 6/2007 | Grose | |
| 2008/0052677 A1 | 2/2008 | Wolf | |
| 2008/0168244 A1 | 7/2008 | Chu Chen | |
| 2008/0288767 A1 | 11/2008 | Wang | |
| 2008/0301504 A1 | 12/2008 | Chen | |
| 2009/0083111 A1 | 3/2009 | Carr | |
| 2009/0089699 A1 | 4/2009 | Saha | |
| 2009/0144827 A1 | 6/2009 | Peinado | |
| 2009/0164115 A1 | 6/2009 | Kosakowski | |
| 2009/0222810 A1 | 9/2009 | Walston | |
| 2010/0306355 A1 | 12/2010 | Lagergren | |
| 2011/0078680 A1 | 3/2011 | Lagergren | |
| 2011/0119370 A1* | 5/2011 | Huang | ............... H04L 43/14 |
| | | | 702/182 |
| 2011/0307879 A1 | 12/2011 | Ishida | |
| 2011/0320794 A1 | 12/2011 | Yang | |
| 2012/0092277 A1* | 4/2012 | Momchilov | ............ G09G 5/003 |
| | | | 345/173 |
| 2012/0191394 A1* | 7/2012 | Uzelac | ............... G06F 3/0446 |
| | | | 702/79 |
| 2012/0236713 A1* | 9/2012 | Kakadia | ............ H04L 47/2458 |
| | | | 370/236 |
| 2012/0266169 A1 | 10/2012 | Lagergren | |
| 2013/0036237 A1 | 2/2013 | Mutisya | |
| 2013/0054819 A1 | 2/2013 | Goldfein | |
| 2013/0254742 A1 | 9/2013 | Hockings | |
| 2013/0278440 A1 | 10/2013 | Rubin | |
| 2013/0278442 A1 | 10/2013 | Rubin | |
| 2013/0278443 A1 | 10/2013 | Rubin | |
| 2013/0279392 A1 | 10/2013 | Rubin | |
| 2013/0279393 A1 | 10/2013 | Rubin | |
| 2013/0279491 A1 | 10/2013 | Rubin | |
| 2013/0279695 A1 | 10/2013 | Rubin | |
| 2013/0281140 A1 | 10/2013 | Rubin | |
| 2013/0281141 A1 | 10/2013 | Rubin | |
| 2013/0282267 A1 | 10/2013 | Rubin | |
| 2013/0282271 A1 | 10/2013 | Rubin | |
| 2013/0282277 A1 | 10/2013 | Rubin | |
| 2013/0282357 A1 | 10/2013 | Rubin | |
| 2013/0293394 A1 | 11/2013 | Rubin | |
| 2013/0346796 A1 | 12/2013 | Niwa | |
| 2014/0040605 A1 | 2/2014 | Futral | |
| 2014/0096126 A1 | 4/2014 | Gourlay et al. | |
| 2015/0149610 A1* | 5/2015 | Jhanb | ............... H04L 67/10 |
| | | | 709/224 |
| 2015/0222536 A1* | 8/2015 | Bergman | ............ H04L 43/0852 |
| | | | 709/224 |
| 2015/0363113 A1 | 12/2015 | Rahman | |
| 2016/0036722 A1 | 2/2016 | Obrecht | |
| 2016/0070633 A1 | 3/2016 | Abraham | |
| 2016/0224426 A1 | 8/2016 | Holden | |
| 2016/0285714 A1 | 9/2016 | He | |
| 2017/0041201 A1* | 2/2017 | Ilyadis | ............... H04L 41/048 |
| 2017/0104629 A1 | 4/2017 | Holden | |
| 2017/0116065 A1 | 4/2017 | Holden | |
| 2018/0129537 A1 | 5/2018 | Kurtzman | |
| 2019/0044805 A1 | 2/2019 | Cobb | |
| 2019/0243697 A1 | 8/2019 | Holden | |
| 2020/0192734 A1 | 6/2020 | Kao | |
| 2021/0135941 A1 | 5/2021 | Cobb | |
| 2021/0165702 A1 | 6/2021 | Kao | |

FOREIGN PATENT DOCUMENTS

| | | |
|---|---|---|
| JP | 2014-052867 | 3/2014 |
| WO | WO0079390 | 12/2000 |

OTHER PUBLICATIONS

International Search Report and Written Opinion in PCT/US2016/016437 dated Jun. 13, 2016.
International Search Report and Written Opinion in PCT/US2016/056784 dated Jan. 18, 2017.
IPRP in PCT/US2016/016437 dated Aug. 17, 2017.
1st Examination Report in AU2016215297 dated Sep. 18, 2017.
IPRP in PCT/US2016/056784 dated Apr. 26, 2018.
Second Examination Report in AU2016215297 dated May 10, 2018.
Third Examination Report in AU2016215297 dated May 15, 2018.
EESR in EP 16747223.2 dated Aug. 3, 2018.
Fourth Examination Report in AU2016215297 dated Sep. 18, 2018.
1st Examination Report in AU2016339974 dated May 31, 2019.
1st Examination Report in AU2018232915 dated Nov. 12, 2019.
ISR and Written Opinion in PCT/US2019/058526 dated Jan. 22, 2020.
2nd Examination Report in AU 2018232915 dated May 4, 2020.
Pre-Examination Office Action in BR 1120180073652 dated Aug. 27, 2020.

* cited by examiner

APPLICATION SERVICE CONFIGURATION SYSTEM

CROSS REFERENCE TO RELATED APPLICATION

This application is a continuation of U.S. patent application No. continuation of U.S. patent application Ser. No. 16/157,436, filed on Oct. 11, 2018, which is a continuation of U.S. patent application Ser. No. 14/881,502, filed on Oct. 13, 2015, now U.S. Pat. No. 10,158,528, which applications are hereby incorporated by reference in their respective entireties.

BACKGROUND

Application-based services are relying more and more on swift response times with low latency in order to provide reliable service and optimal user experience. In certain situations or regions, high network latency severely affects the ability of an application service provider to deliver the application service at the performance potential of which the application service is ideally designed.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
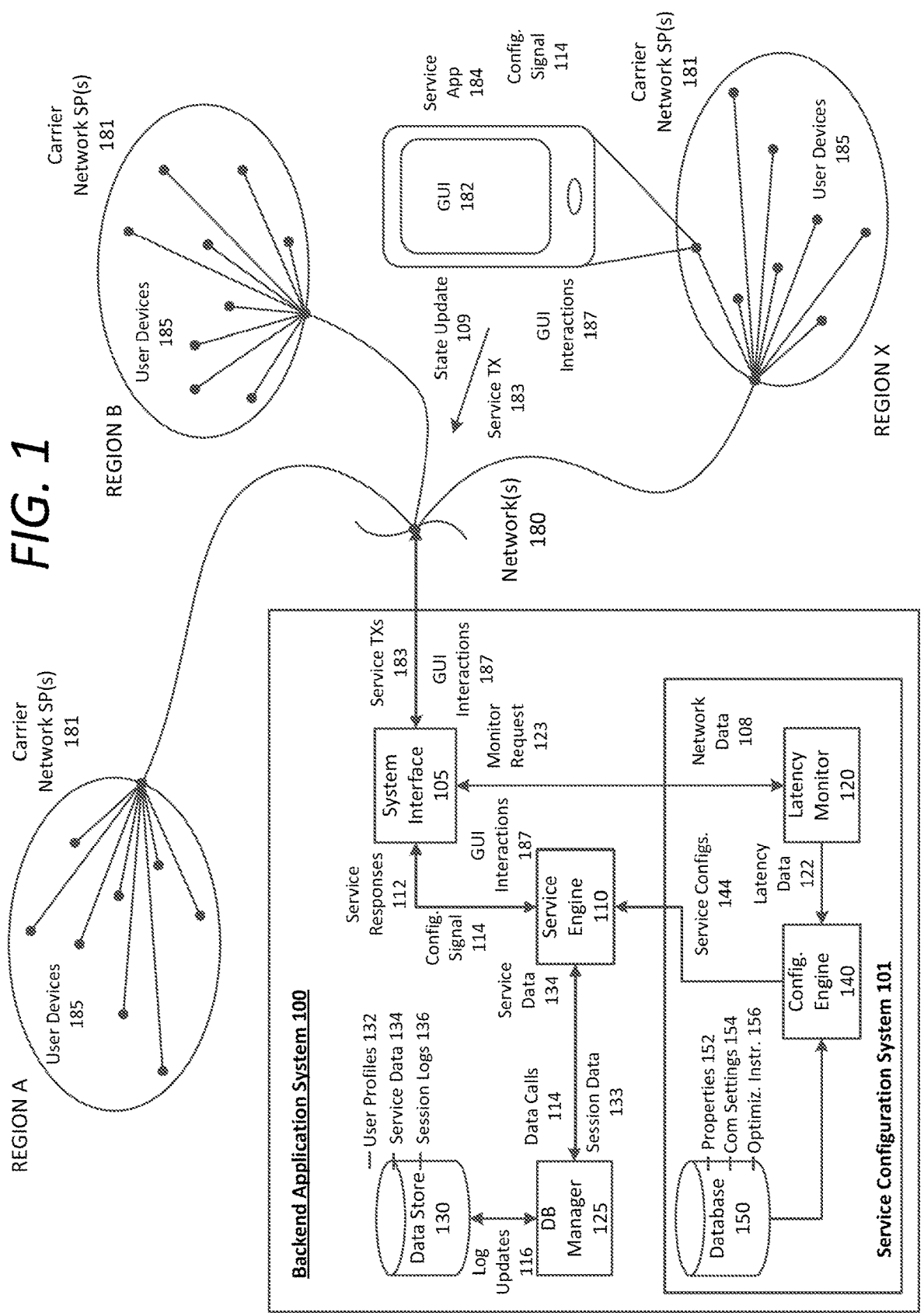
FIG. 1 is a block diagram illustrating an example service configuration system in connection with a backend application system providing an application service.

A principal concern for service entities managing application services running on user devices is latency between a backend server(s) and the service entity's clients. A service entity can mitigate latency effects by optimizing the service application itself and the hosting infrastructure managing the communications and transactions. However, a considerable influence on latency is the quality of the carrier network between the backend servers and the client devices running the service application. For service applications requiring continuous communications, data updates, and networking between a population of users, latency can have an enormous effect on user experience.

Previous solutions to address latency involve optimization of on-device caching, scripting, and configuring backend servers to ensure sufficient CPU and memory to serve application clients. Yet, a constant concern for application services that require continuous communications and data updates is the dependency on telecommunications service providers that provide the communications services to users in a given geographical region. The carrier networks provided by these service providers often experience latency increases due to high network traffic, or any number of issues within the service provider's network infrastructure (e.g., issues with propagation delay, serialization, hop count, end point and/or gateway issues, etc.). Thus, the previous solutions typically involve sidestepping the latency issues in the carrier network by, for example, caching data offline and utilizing the client device to provide data updates. However, this solution is ineffective when the application service involves intricate timing, such as connecting clients with other clients dynamically (e.g., for time-sensitive financial or asset transactions, ride sharing applications, gaming environments, any services requiring client authentication, and the like).

To address the limitations in the prior solutions, a service configuration system is provided in connection with an application service to dynamically configure the properties of a designated application running on user devices, and/or the properties of a backend datacenter(s) managing the application service, in response to detecting network latency outside an acceptable latency range. In many aspects, the service configuration system can monitor network latency for each of a plurality of carrier networks by identifying response times and carrier codes in the periodic communications between the client devices and the backend datacenter. For each given geographic region or operational market, the service configuration system can compare current response times for each carrier network with a normal response time (e.g., an average response time over a predetermined time period), and identify when the current response times cross outside an acceptable latency range (e.g., bound by an upper and lower latency threshold of ±10%).

Application services requiring continuous communications and updates can have default configurations for both the backend datacenter and the service application running on the client devices. These configurations can comprise the amount and type of data (e.g., analytics data) transmitted from the client devices, and the backend properties that control the service application (e.g., app timing restrictions or expansions). In a network-constrained environment, using default or standard configurations can cause delays in response times for the service application. This can have a significant impact on user experience when comparing normal network performance with a network-constrained environment.

According to examples described herein, the service configuration system can identify when the latency for a particular carrier network has exceeded a latency threshold (e.g., the upper and/or lower boundaries of a preconfigured latency range). In response to identifying that a latency threshold has been exceeded, the service configuration system can configure the properties of the designated service application running on the client devices and/or the backend properties that control the service application. The service configuration system can do so by dynamically modifying default configurations, such as the amount and/or type of data transmitted from the client devices on each periodic transmission, and/or by modifying the default application configurations of the service application running on the client devices themselves. The service configuration system can perform such modifications for every device in a given region (e.g., a particular city operated by one or more datacenters, or a common geographic region or operational market), or isolate such modifications for only those devices in the given region using the carrier network associated with the network latency. Furthermore, the service configuration system can prioritize certain client devices to remain unaffected based on a device or application status (e.g., a "live" status or "on-trip" status).

Aspects described herein can further be implemented proactively in connection with a network monitoring system (e.g., third-party application performance monitoring). For example, network monitoring can include monitoring the health of various network links and/or monitoring network routing, and providing alerts or reports directed to the health of the network. Such networking monitoring systems can be executed on backend application servers, or can be configured remotely for remote monitoring, management, and control. Examples described herein can generate service configuration signals to modify application performance configurations (running on client devices and/or the backend properties that control the service application) in response to or in conjunction with network alerts and/or reports indicating delayed response times.

In certain implementations, the service configuration system can be utilized in connection with a transportation facilitation system, such as the transportation facilitation platform managed by UBER TECHNOLOGIES, INC. In such implementations, live sessions logs can associate each rider and driver device with a unique identifier, an identification of the device's service provider, a last response time (e.g., round trip time (RTT) or ping) and can store live status information, location data, and the like. Furthermore, the transportation facilitation system can connect riders with available drivers in near real time by receiving pick-up requests from requesting riders and transmitting invitations to proximate available drivers to service the pick-up request. For any given pick-up request, the transportation facilitation system can (i) give an available driver a set time limit (e.g., 15 seconds) to accept the invitation to service the pick-up request, (ii) resend a driver invitation to service the pick-up request if a previous available driver does not accept (e.g., after 20 seconds), and (iii) set a total invitation time for each pick-up request given a set number of available drivers an opportunity to accept an invitation (e.g., 60 seconds total). Each of these timing variables may be adjusted by the backend system in response to a detected latency. Furthermore, a pool of available drivers or a geo-fence surrounding a pick-up request location may be adjusted by the backend system based on the detected latency, as provided by a configuration signal generated by the service configuration system disclosed herein.

Among other benefits, the examples described herein achieve a technical effect of mitigating the effects of network latency for specialized application services that require dynamic updating and/or sensitive response timing.

As used herein, a computing device refer to devices corresponding to desktop computers, cellular devices or smartphones, personal digital assistants (PDAs), laptop computers, tablet devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

Systems Description

FIG. 1 is a block diagram illustrating an example service configuration system 101 in connection with a backend application system 100 providing an application service. The service configuration system 101 can be utilized by various types of application services, such as mapping application services that provide mapped directions to a particular destination. As another example, ride sharing services, such as those provided by UBER TECHNOLOGIES, INC., can provide a service application 184 for download on any number of user devices 185 in any number of geographic regions (e.g., operational markets worldwide). The service application 184 can cause a graphical user interface (GUI) 182, specific to the application service, to be generated on the display screens of the user devices 185.

The users of the user devices 185 may perform GUI interactions 187 with the GUI 182 in order to utilize the application service. The application service can be facilitated by a backend application system 100, which can comprise a number of computer systems to execute instructions and run processes in order to implement the application service on the user devices 185 over one or more networks 180. For example, a backend application system 100 for mapping service can receive GUI interactions 187 comprising an inputted destination on a user device 185. The backend application system 100 can utilize location-based resources (e.g., global positioning system (GPS) resources) of the user device 185 in order to provide dynamic directions to the user device 185 until the destination is reached. The uninterrupted time between initiating the map service and reaching the destination can comprise multiple periodic service transmissions 183 (e.g., every three or four seconds) between the backend application system 100 and the user device 185. Accordingly, the backend application system 100 can periodically receive location and data pings from the user device 185 and transmit back GUI data (e.g., a graphic map) showing the live directions to the destination.

The backend application system 100 illustrated in FIG. 1 can be utilized by various types of application service entities to provide a corresponding application service (e.g., social media services, communication services, mapping services, asset sharing services, ride sharing services, resource optimization services, financial services, etc.). The backend application system 100 can represent an active region for the application service (e.g., a geographical region or a specified population of users). The backend application system 100 can further include a service engine 110 to process the GUI interactions 187 performed on the user device 185 running the service application 184. For various application services, the GUI interactions 187 can be received by a system interface 105 of the backend application system 100 running the application service. The GUI interactions 187 can then be processed by the service engine 110 to instigate a response. For example, the service engine 110 can interpret the GUI interactions 187 by initiating data calls 114 to a local data store 130 (or one or more external databases) in order to provide relevant data in response.

The data store 130 can include data relevant to the application service, such as user profiles 132, service data 134, and live session logs 136 to update real-time data (e.g., a user status and location) over the course of an application session. According to some implementations, the backend application system 100 can further include a database manager 125 to maintain the session logs 136 by providing log updates 116 based on service transmissions 183, and respond to data calls 114 from the service engine 110.

In many examples, each user device 185 running the service application 184 can periodically transmit a service transmission 183 in accordance with, for example, a ping protocol every four or five seconds. Additionally or alternatively, the user devices 185 can initiate a communication link to transmit a state update 109 whenever a state of the user device 185 changes in the context of the service application 184. For example, a user device 185 utilizing a mapping service application 184 can transmit a state update 109 when the user device 185 initiates the service application 184, inputs a particular destination, arrives at a destination, terminates the service application 184, etc.

In accordance with certain examples, the service engine 110 can (i) pull service data 134 from the data store 130 in response to specified GUI interactions 187, (ii) process the service data 134 in light of the GUI interactions 187, and (iii) transmit service responses 112 back to the user device 185 accordingly. For example, a backend application system 100 servicing a social media application can enable users to generate personal media updates and communicate with other users in real time by processing interactions 187 and outputting service responses 112 to, for example, update a user's profile page or update the GUI 182. State updates 109 and/or session transmissions 183 (e.g., analytics data responses) from the user device 185 may comprise information indicating a current status of the user device 185, such as one or more other users in active communication with the user device 185, the device location, an operational status of the device 185, a unique identifier, and the like.

In many aspects, the application service managed by the backend application system 100 can be offered in various geographic regions defined by population, datacenter coverage by the application service entity (e.g., operational markets), city, or geographic area. As shown in FIG. 1, multiple regions (Region A, Region B, and Region X) can include various user devices 185 running the service application 184, and one or more third party network service providers 181 that provide the communication services between the user devices 185 and the backend application system 100 managing the application service.

For illustrative purposes, the backend application system 100 is shown as a single backend device in communication with multiple geographic regions. However, in implementation, datacenters or backend servers can be utilized in each region or multiple regions to manage the application service. The backend application system 100 of FIG. 1 may represent a single or multiple servers located in each region, or service multiple regions.

According to examples described herein, the service configuration system 101 can submit a network monitoring request 123 to the backend application system 100 to monitor network latency for a sampling of the user devices 185 (e.g., 5% of all user devices 185 in a given geographic region, or 5% of user devices 185 per carrier network per geographic region), or all of the user devices 185 in a given region. The service transmissions 183 received from the user devices 185 can include analytics data comprising a device identifier, a device status (e.g., in the context of the service application), location data, network service provider data (e.g., mobile country code (MCC) and mobile network codes (MNC)), response time (i.e., round trip time (RTT)), etc.

In many aspects, the backend application system 100 can process the monitor request 123 by sending network data 108 comprising the response time and the network service provider 181 data back to the service configuration system 101. The service configuration system 101 can process the network data 108 to identify whether the network latency is within an acceptable latency range. In certain implementations, the service configuration system 101 can include a latency monitor 120 to compare the current network latency with an averaged or normalized response time for the given region. If the current network latency is above an upper latency threshold or below a lower latency threshold, the latency monitor 120 can provide latency data 122 to the service configuration system 101 to generate a response.

In certain examples, the service configuration system 101 can automatically provide service configurations 144 to the backend application system 100 based on the latency data 122. For example, if the latency data 122 indicates that a particular carrier network is responsible for latency above the upper latency threshold, the service configuration system 101 can provide the backend application system 100 with default service configurations 144 to modify the properties of the service application 184 running on the user devices 185 using the deficient carrier network, and/or configure the backend application system 100 to adjust for the heightened latency. Such automatic service configurations 144 can configure the amount of data communicated and the backend configurations for all of the user devices 185 in a given region, or for just those user devices 185 that operate using the deficient carrier network 181.

The service configurations 144 can cause the backend application system 100 to modify, for example, response times on the running applications or GUI 182 features requiring GUI user interaction 187 (e.g. varying time limits in which the user must respond to a particular request or offer). Additionally or alternatively, the service configurations 144 can cause the service application 184 on the user devices 185 to transmit more or less data per service transmission 183 or state update 109. For example, the service configurations 144 can cause the user devices 185 to strip away some or all unnecessary data (e.g., a session ID, analytics event data, location data, etc.) unless necessary for the sessions logs 136 containing relevant session data. In some instances, the service configurations 144 can cause certain user devices 185 to cease transmitting all data until a state of the service application 184 changes (e.g., when the user initiates or terminates the service application 184, or changes a status on the service application 184).

In variations, the latency monitor 120 can provide the latency data 122 to a configuration engine 140 of the service configuration system 101, which can process the latency data 122 to determine a set of service configurations 144 to optimize the application performance in light of the network latency. In some aspects, the service configuration system 101 can include a database 150, which can include data corresponding to various properties 152 of the backend application system 100, and communication settings 154 (e.g., default, optimized, and/or high performance communication settings). Additionally, the database 150 can store optimization instructions 156 that can be executed by the configuration engine 140 to determine an optimal application configuration in light of the latency data 122.

As an example, using the network data 108, the latency monitor 120 can determine that Service Provider C within Region X is responsible for network latency, whereas user devices 185 using other service providers experience normal response times. The latency monitor 120 can identify that the network latency for Service Provider C exceeds a latency threshold and submit the latency data 122 for Service Provider C to the configuration engine 140. The configuration engine 140 can execute optimization instructions 156 using the latency data 122 to determine an optimal set of service configurations 144 to modify one or more of the application performance, the backend application configurations, or the amount of data transmitted per service transmission 183 from the user devices using Service Provider C.

For example, the properties 152 can include variable application features (e.g., timing features) that the backend application system 100 can modify for the service application 184 in order to reduce the network latency. Additionally, the communication settings 154 can include specific data items transmitted between the backend application system 100 and the user devices 185. The configuration engine 140 can utilize such properties data 152 and communication settings 154 to generate a service configuration signal comprising an optimized set of service configurations 144 (e.g., modified variables by the backend and/or the modified communications). The optimized set of service configurations 144 can cause the backend application system 100 and the service application 184 running on Service Provider C devices to instigate the modifications (e.g., adjusting performance configurations of the service application 184) to achieve a response time within an acceptable latency range (e.g., within 10% of a normalized response time).

In certain implementations, the latency monitor 120 can continually request network data 108 from Service Provider C devices to determine when the network latency renormalizes. For example, if Service Provider C was associated with high network latency, and the service configurations 144 generated by the configuration engine 140 caused response times from Service Provider C to be within an acceptable latency range, the latency monitor 120 can identify when the latency drops back to within the normal range. Thus, the configuration engine 140 can generate and transmit a signal causing the backend application system 100 and service application 184 on Service Provider C devices to restore normal operations.

Example Service Configuration System

Figure 2:
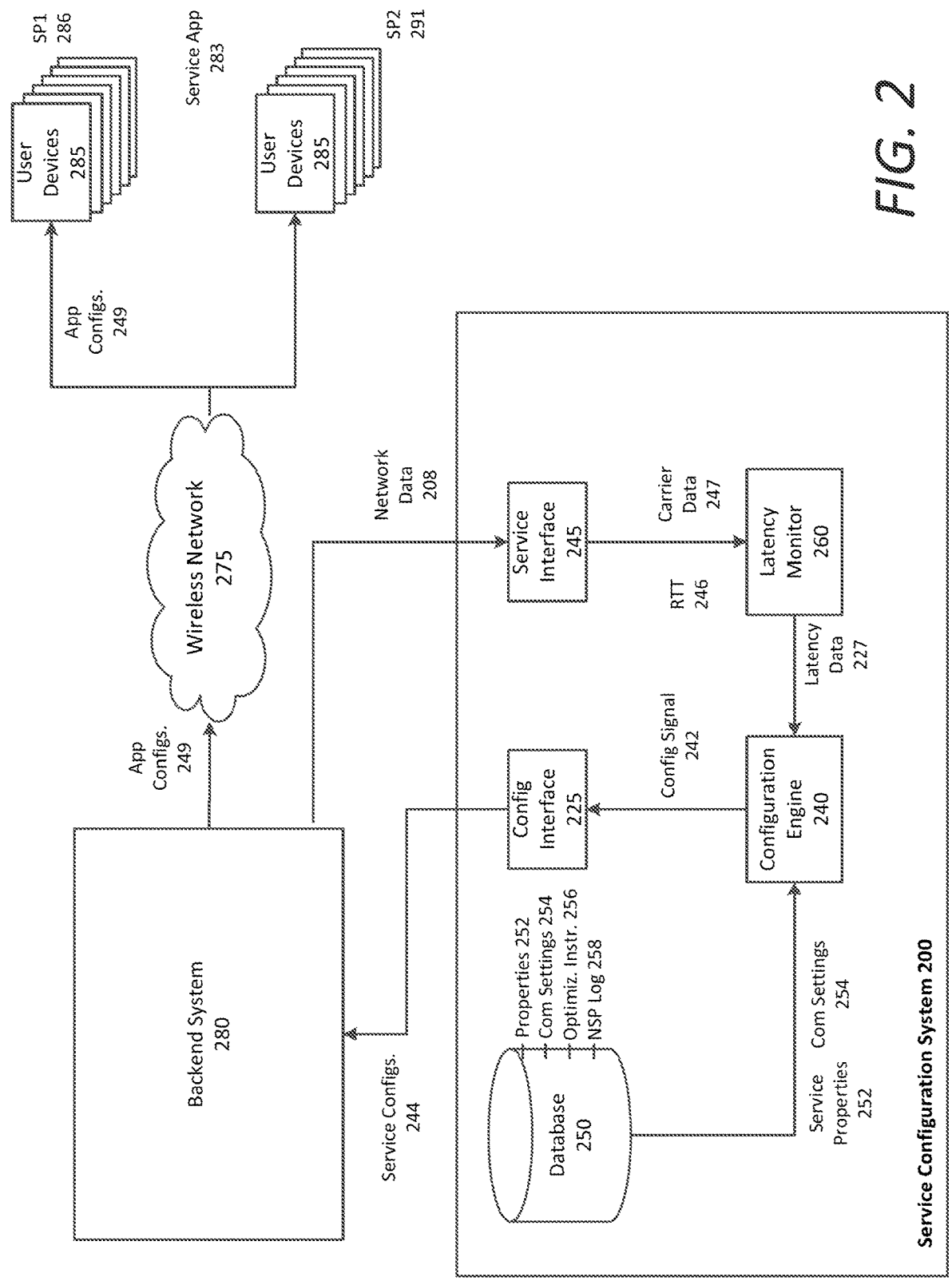
FIG. 2 is a block diagram illustrating an example service configuration system as described herein.

FIG. 2 is a block diagram illustrating an example service configuration system as described herein. The service application system 200 shown in FIG. 2 can be implemented in connection with a backend system 280 providing application services to a number of user devices 285, such as the backend application system 100 described in connection with FIG. 1. For example, the service configuration system 200 can be implemented as an internal component of the backend system 280, or as a standalone module that can be configured with the application properties 252 and communication settings 254 of the service application 283 running on the user devices 285. Furthermore, the service configuration system 200 can operate within a particular geographic region in which the service application 283 is provided (e.g., a city). Still further, the geographic region can be serviced by a single or plurality of network service providers. In the example provided, a first set of user devices 285 use Service Provider 1 (SP1) 286 and a second set of user devices 285 use Service Provider 2 (SP2) 291. However, any number of user devices 285 can operate within the geographic region utilizing any number of network service providers.

Referring to FIG. 2, the service configuration system 200 can include a service interface 245 to receive network data 208 corresponding to a select set of user devices 285 running the service application 283. The network data 208 can indicate a response time (RTT 246) for each of the select set of user devices 285, and carrier data 247 (e.g., MNC and/or MCC codes) indicating whether a particular user device 285 uses SP1 286 or SP2 291. The service configuration system 200 can include a latency monitor 260 to identify whether the RTT 246 for the particular user device 285 is within a predetermined latency range. If not, the latency monitor 260 can identify the service provider (e.g., SP1 286 or SP2 291) from the carrier data 247 and provide latency data 227 to a configuration engine 240 of the service configuration system 200.

In some aspects, using the carrier data 247 (e.g., MCC and MNC), the configuration engine 240 can perform a lookup in a network service provider (NSP) log 258 stored in a database 250 to identify the particular service provider associated with the network latency. The configuration engine 240 can also execute optimization instructions 256 to utilize stored service properties 252 and application communication settings 254 for the service application 283 to determine an optimized set of configurations 244 to account for the network latency.

For example, the RTT 246 for a set of user devices 285 using SP1 286 can indicate latency below a lower latency threshold—indicating heightened network performance for SP1 286. The configuration engine 240 can determine that more analytics data can be transmitted from the user devices 285 using SP1 286 and/or the performance of the service application 283 can be bolstered on those devices and still communicate data within the acceptable latency range. Accordingly, the configuration engine 240 can generate a configuration signal 242 comprising service configurations 244 for the backend system 280 and/or service application 283 and transmit the configuration signal 242 via a configuration interface 225 to the service configuration system 200. The configuration signal 242, and service configurations 244 therein, can cause the backend system 280 to adjust backend application properties, and provide application configurations 249 to the SP1 286 user devices 285 over the wireless network 275 to bolster communications (e.g., transmit data more often and/or transmit more data per ping response).

As another example, the RTT 246 for a set of user devices 285 using SP2 291 can indicate network latency above an upper latency threshold, which can cause delayed communications and data updates. The configuration engine 240 can utilize the latency data 227 from SP2 291 user devices 285 to determine an optimized set of configurations 244 to adjust the performance configurations of the service application. For example, the optimized set of configurations 244 can modify application settings and/or data communications back to within the acceptable latency range. In some aspects, the communication settings 254 can be predetermined (e.g., low performance, default, high performance), and thus the configuration engine 240 can automatically select the low performance settings for the SP2 291 user devices 285. Accordingly, in response to the application configurations 249 causing the low performance settings, the SP2 291 user devices 285 can strip away unnecessary data and/or only provide a service transmission when an application state changes (e.g., an "in-session" or "standby" status change). Additionally or alternatively, the service configurations 244 can cause the backend system 280 to adjust application variables, such as timers giving a user more or less time to respond to a particular request.

In examples described herein, the network data 208 can be received from a sampling of SP1 286 user devices 285 and a sampling of SP2 291 user devices 285. However, when network latency is detected for either sampling, the service configurations 244 and application configurations 249 can be applied to all user devices 285 (e.g., using SP1 286 and SP2 291), user devices 285 per carrier (e.g., all user devices 285 using SP2 291), or a subset of user devices 285 (e.g., all user devices using SP2 291 that have a particular status). In the latter case, the configuration engine 240 can identify that normal response times can be achieved with only minor adjustments to application communications, and can prioritize certain user devices 285 over others. For example, user devices 285 that have a current "live" status (e.g., an on-trip status for a ride sharing application, or an in-session status for a gaming application) can have priority over user devices 285 that are in standby mode (e.g., when the backend system 280 identifies a break from application services on a particular device).

Accordingly, as an example, a live hierarchy of SP2 291 user devices 285 can be referenced by the configuration engine 240. The live hierarchy can be a device log that can rank user devices 285 based on operational status. The optimization instructions 256 can identify that limiting communications from one or more lower hierarchical sets of user devices 285 can compensate for the heightened network latency. Thus, the configuration engine 240 can generate the configuration signal 242 to affect communications of only those lower tiered SP2 291 user devices 285, and then restore communication settings once the latency normalizes.

Example Transportation Facilitation System

Figure 3:
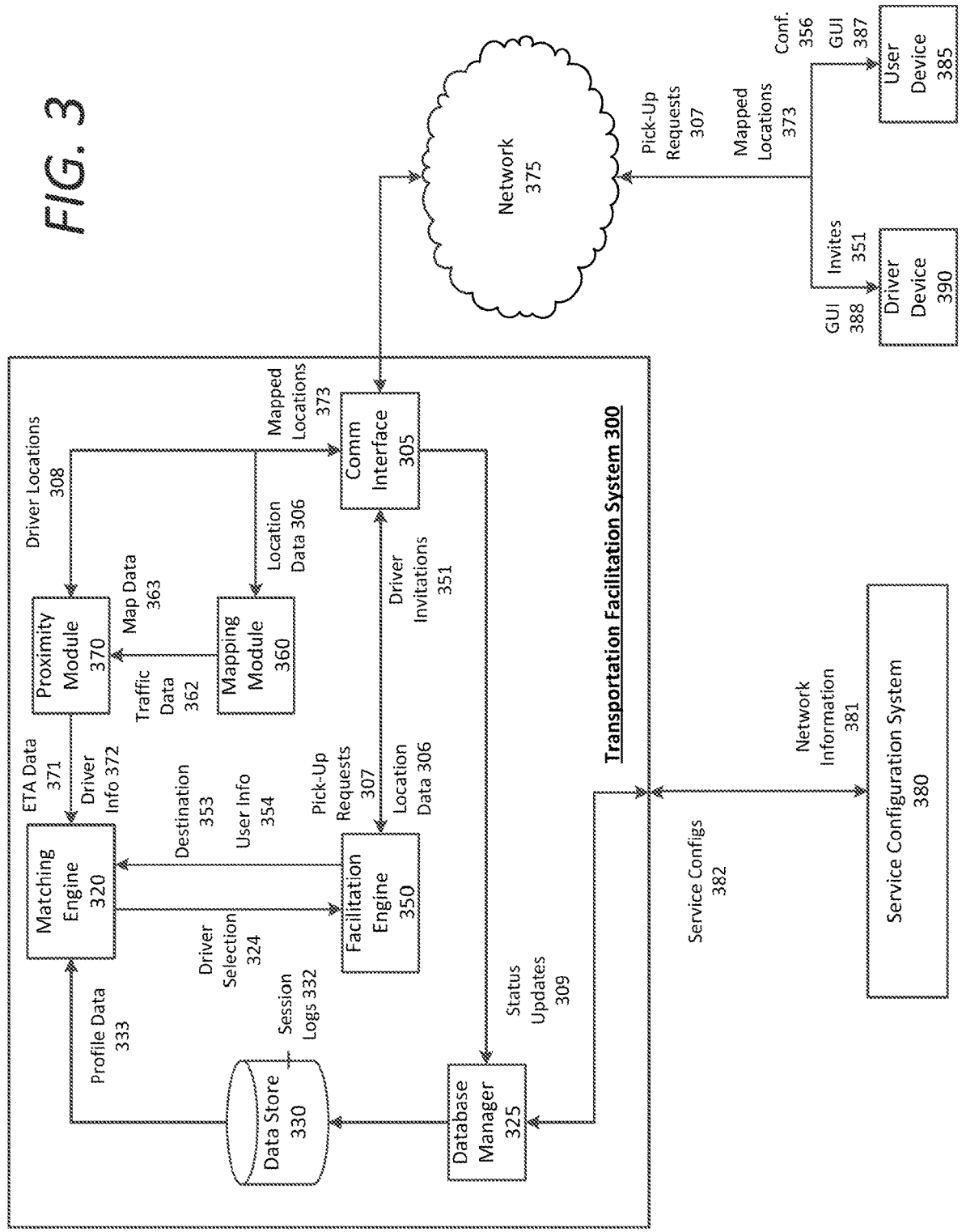
FIG. 3 is a block diagram illustrating an example transportation facilitation system upon which an example service configuration system can be implemented.

FIG. 3 is a block diagram illustrating an example transportation facilitation system upon which an example service configuration system can be implemented. As described herein, the transportation facilitation system 300 (and/or the client applications operating on user devices 385 and driver devices 390) can provide a network service or platform in which riders and drivers can be matched for receiving and providing transport services. For example, the network service can be accessible on user devices 385 and driver devices 390 via execution of a designated client application, which can generate a graphical user interface (GUI) 387 specific to the user device 385, or a GUI 388 specific to the driver device 390 (e.g., a rider application or a driver application, respectively). When a driver is selected to service a particular pick-up request 307, the transportation facilitation system 300 can generate and transmit an invitation 351 to a selected driver device 390 (e.g., a most proximate driver device 390) to service the pick-up request 307.

A database manager 325 of the transportation facilitation system 300 can store and update live session logs 332 in a data store 330 comprising device IDs, status information, location information, and the like. For example, for each driver device 390, the transportation facilitation system 300 can receive status updates 309 that include various data such as an updated location and driver status (e.g., accepted invitation, rejected invitation or timeout, en route to pick-up, on-trip to destination, carpool status, available, unavailable, etc.). In some aspects, the database manager 325 can rank driver devices 390 in a hierarchy according to device status for purposes of service configurations 382 by a connected service configuration system 380 in the event of detected network latency. Additionally or alternatively, the session logs 332 can further attribute driver device 390 and/or user device 385 with a service provider that the particular device uses (e.g., AT&T, VERIZON, etc.), as described herein.

Additionally, the database manager 325 can store and update records for one or more fleets of autonomous vehicles (AVs) that can be utilized to service pick-up requests 307. For each AV, the records can include live location information, service records, vehicle type, vehicle features, vehicle status (e.g., in use or available), home location, remaining fuel or power, a trip count and/or summary, an AV user rating, available services (e.g., Internet connectivity, user interface features, entertainment features, etc.), a service provider ID, and the like. The transportation facilitation system 300 can update the AV records for any number of events, or type of events. Each AV may include an AV profile in the data store 330, and/or a log row in the session logs 332, that comprises AV data that may be dynamically updated. Accordingly, the service configurations 382 provided by the service configuration system 380 may also be applied to an AV utilizing a deficient carrier network.

The transportation facilitation system 300 can include a transportation facilitation engine 350, which can provide driver invitations 351 to service individual pick-up requests 307 based on a variety of factors. The transportation facilitation system 300 may include a communication interface 305 for communication with user devices 385 and driver devices 390. A user that wishes to submit a pick-up request 307 can launch the designated application on the user's device 385 (e.g., a smartphone, a tablet computer, a wearable computing device, a personal computer, etc.), which can generate a GUI 387 specific to the transport service. Using the GUI 387, the user can send a pick-up request 307 indicating a pick-up location and/or a destination. The pick-up location can correspond to a current location of the user device 385 (by using geo-aware or location-based resources of the user device 385) or a specified location inputted by the user. The communication interface 305 can provide the pick-up request 307 to the facilitation engine 350, which can submit the requesting user's information 354 (e.g., the user's name, a unique identifier, or some other identifying criteria of the user) to a matching engine 320 of the transportation facilitation system 300.

Upon receiving the pick-up request 307, the facilitation engine 350 may also receive location data 306 of the requesting user. The location data 306 may be received via location-based resources of the user device 385, or may be received as a part of the pick-up request 307. The location data 306 may further be transferred to a mapping module 360 of the transportation facilitation system 300. Upon launching the designated application, or upon receiving the pick-up request 307, a proximity module 370 of the transportation facilitation system 300 can identify the driver locations 308 of all available (or unavailable) proximate drivers in relation to the requesting user. In one example, a driver tracking component (e.g., the database manager 325) can periodically receive location information (e.g., the driver locations 308) corresponding to the current location of the driver devices 390 in the status updates 309, and update the sessions logs 332 to indicate the driver locations. Thus, in certain aspects, the proximity module 370 can reference the session logs 332 to identify driver locations proximate to the requesting user device 385.

In some examples, the mapping module 360 can provide the location of the requesting user and provide map data 363 of a geographic region that includes or corresponds to the pick-up location to the proximity module 370. Additionally, the mapping module 360 may further provide traffic data 362 to the proximity module 370 identifying traffic conditions near the requesting user. While the mapping module 360 of FIG. 3 is shown as a component of the transportation facilitation system 300, other arrangements are contemplated in which the mapping data 363 and traffic data 362 are provided by an external mapping resource over the network 375.

As an addition or alternative, the proximity module 370 can utilize the map data 363, including the pick-up location and the driver locations 308 to identify the proximate drivers in relation to the requesting user (or the user's specified pick-up location). In some implementations, the proximity module 370 can provide the mapped locations 373 to the user's device 385—where the mapped locations 373 can include a map comprising the real-time relative locations of proximate drivers in relation to the user's current location, or in relation to a pinned pick-up location configured by the requesting user on the GUI 387.

The proximity module 370 can determine which drivers are within a predetermined distance of the pick-up location (e.g., within four miles) and/or are within an estimated time of travel from the pick-up location (e.g., within six minutes). For example, the proximity module 370 can utilize the driver locations 308, the map data 363, and/or the traffic data 362 to determine an estimated time of arrival (ETA) 371 for each of the proximate drivers to the user's location. As described below, the ETA data 371 for each proximate driver can be utilized by the matching engine 320 as one of a number of optimization factors to ultimately select an optimal driver to service the pick-up request 307.

As provided herein, the matching engine 320 can receive the user information 354 of the requesting user from the facilitation engine 350. The matching engine can make a driver selection 324, from the proximate drivers, to service the received pick-up request 307. Additionally, the matching engine 320 can utilize the ETA data 371 generated by the proximity module 370 to make the driver selection 324. Additionally or alternatively, the matching engine 320 can utilize the destination 353 indicated by the user. Further information, such as environmental factors, pricing conditions, traffic conditions, etc., may also be considered by the matching engine 320 in making the driver selection 324.

In various examples, the matching engine 320 can make comparisons between the profile data 333 of proximate drivers and the requesting user to make the driver selection. The profile data 333 can include driver traits (e.g., driver behaviors, tendencies) and ratings from feedback data from users, and/or reputation data gathered from third-party resources. Additionally, the profile data 333 can include invariable data including, for example, the driver's age, gender, vehicle type, and the like. Further, the profile data 333 of requesting users may indicate preferences directly configured by the requesting user, or preferences determined by the transportation facilitation system 300 based on the requesting user's rating history.

In accordance with examples described herein, the facilitation engine 350 can receive a pick-up request 307 from a respective user device 385 and transmit identifying user info 354 and the selected destination 353 to the matching engine 320. Furthermore, the proximity module 370 can identify proximate drivers in relation to the requesting user and calculate or estimate an ETA 371 for each of the proximate drivers. The matching engine 320 can utilize identification information for both the requesting user and the proximate drivers to perform a matching operation. The matching engine 320 can submit a driver selection 324 to the facilitation engine 350, which can transmit a driver invitation 351 to the selected optimal driver based on the matching operation. Once the selected driver accepts the invitation 351, e.g., by providing input on the driver application, the facilitation engine 350 can submit a confirmation 356 to the requesting user's device 385 indicating that the optimal driver has been selected for the user and is en route to service the user.

In various examples, live data corresponding to device status for user devices 385 and driver devices 390 can be stored in the data store 330. The data store 330 can include permanent or temporary storage frameworks that enable the transportation facilitation system 300 and/or the user and driver devices 385, 390 to provide live updates to dynamic data (e.g., live location and status data). Such data may be updated dynamically by the database manager 325 as live session logs 332 comprising data indicating whether the designated application has been activated on a particular user device 385 or driver device 390, the current location of a particular user or driver (e.g., coordinate data), a live status indicator (e.g., whether the driver is available, en-route, currently servicing a pick-up request 307, etc.), live acceptance rates, home locations, service type data, response time data, service provider data, and the like.

According to examples, the service configuration system 380 can receive network information 381 from the transportation facilitation system 300 indicating whether network latency exists for one or more service providers. In many aspects, the service configuration system 380 can receive only network information 381 from status updates 309 provided by the driver devices 390. In other aspects, the network information 381 may be received for both driver devices 390 and user devices 385. In any case, the network information 381 can include latency information that can comprise response time data (i.e., RTT data), and carrier data indicating the particular service provider associated with the response time.

The service configuration system 380 can compare the RTT data to a normalized latency range (e.g., ±10% of average response time over the last seven days). Based on network latency detected for a particular service provider, the service configuration system 380 can generate and transmit a service configuration signal comprising service configurations 382 to adjust properties of the transportation facilitation system 300 and/or the communication settings corresponding to data communicated from the driver devices 390 and/or user devices 385.

As provided herein, the service configurations 382 may apply to all devices within a given region, only devices using the deficient service provider, only driver devices 390, only driver devices 390 using the deficient service provider, or a subset of devices (user and/or driver devices 385, 390) using the deficient service provider based on, for example, a status hierarchy indicated in the session logs 332. Furthermore, the service configurations 382 can cause the transportation facilitation system 300 to adjust certain variables of the designated application running on those selected devices. For example, the transportation facilitation system 300 can adjust an amount of time a particular driver has to respond to a driver invitation 351, and/or a total time before the pick-up request expires.

Additionally or alternatively, the service configurations 382 can cause the designated application running on the selected devices (e.g., driver devices 390 using the deficient service provider) to transmit more or less data (e.g., based on the detected latency). For example, if latency is detected above a upper threshold of the latency range, the service configurations 382 can cause the select devices to transmit less data or only necessary data per ping response, or to transmit a state update 309 only when a status of the device changes (e.g., when a driver device 390 becomes available). As another example, if latency is below a lower latency threshold, the service configurations 382 can cause the select devices to transmit more analytics data to enhance user experience.

Methodology

Figure 4:
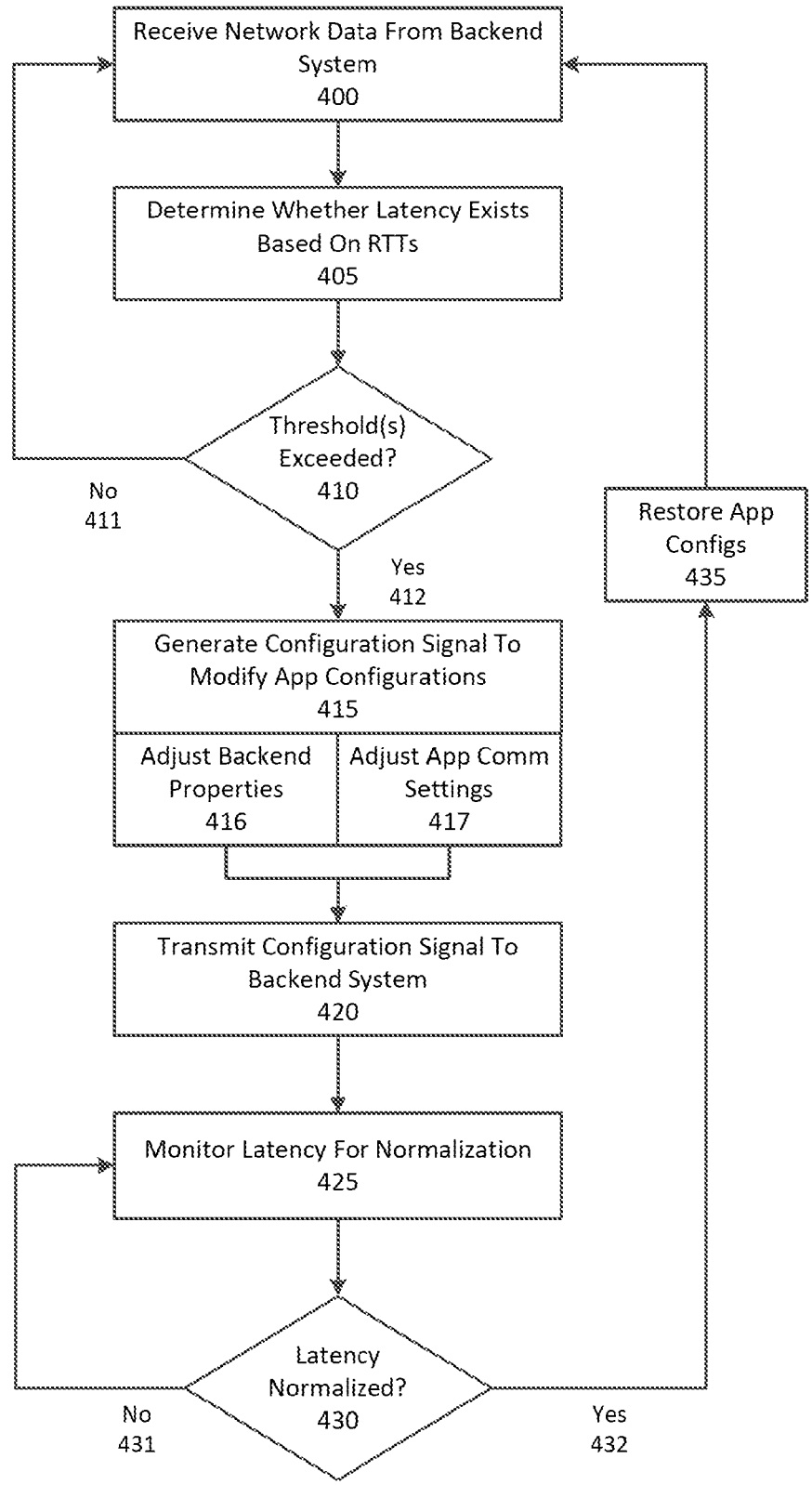
FIG. 4 is a high level flow chart describing an example method of configuring an application service in response to detected network latency.

FIG. 4 is a high level flow chart describing an example method of configuring an application service in response to detected network latency. In the below description of FIG. 4, reference may be made to like reference characters representing various features of FIGS. 1-3 for illustrative purposes. Furthermore, the high level method described in connection with FIG. 4 may be performed by an example service configuration system 101, 200, 380 as shown and described with respect to FIGS. 1-3. Referring to FIG. 4, the service configuration system 101 can receive network data 108 from a backend application system 100 (400). As provided herein, the backend application system 100 can manage an application service, such as the transportation facilitation service provided by the transportation facilitation system 300 described in connection with FIG. 3. Furthermore, the network data 108 can include RTT data and carrier data identifying a particular service provider for each user device 185.

Based on the RTT data, the service configuration system 101 can determine whether latency exists beyond an acceptable latency range for each user device 185 (405). Accordingly, the service configuration system 101 can determine whether the upper or lower latency threshold is exceeded (410). The acceptable latency range can be preconfigured by the backend system 100 or the service configuration system 101 based on, for example, operational requirements of the service application 184, an upper latency boundary in which the performance of the service application 184 becomes unacceptable (e.g., based on revenue decrease or lower user base), and a lower latency boundary in which the performance of the service application 184 can be boosted to enhance user experience.

In various examples described herein, if a latency threshold is not exceeded (411) the process repeats and the service configuration system 101 can continue to receive network data 108 from the backend system 100. However, if a latency threshold is exceeded (e.g., the upper or lower boundary is crossed) (412), then the service configuration system 101 can generate a configuration signal comprising application service configurations 144 to compensate for the detected latency (415). For example, the service configurations 144 can cause the backend system 100 to adjust certain backend properties (416) such as variable GUI features, and/or adjust application communication settings (417) on the service application 184 to transmit more or less data, or adjust the timing of pings and responses.

Accordingly, the service configuration system 101 can transmit the service configurations 144 to the backend system (420) to implement the modifications. Thereafter, the service configuration system 101 can monitor the latency for the reconfigured devices (425) and determine whether the latency has been normalized (430). If the network latency has not been normalized (e.g., the service provider has not resolved the issue) (431) the service configuration system 101 can continue to monitor the network latency for the reconfigured devices (425). However, if the network latency has been normalized (432), then the service configuration system 101 can generate and transmit a configuration signal, for example, comprising default configurations to the backend system 100 to restore the application configurations (435), and the process can repeat at block (400).

Figure 5:
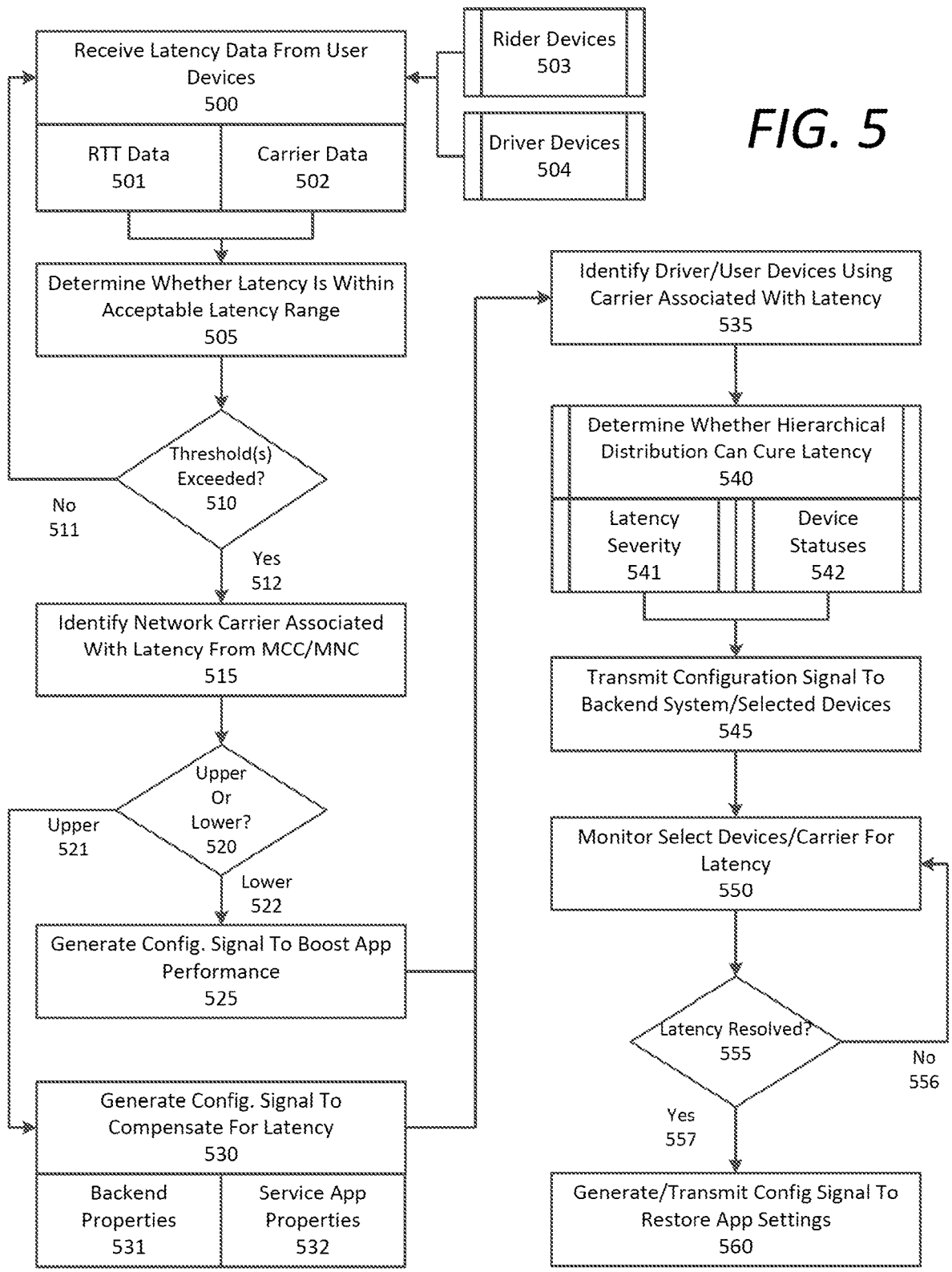
FIG. 5 is a low level flow chart describing an example method of configuring an application service in response to detected network latency.

FIG. 5 is a low level flow chart describing an example method of configuring an application service in response to detected network latency. In the below description of FIG. 5, reference may be made to like reference characters representing various features of FIGS. 1-3 for illustrative purposes. Furthermore, the low level method described in connection with FIG. 5 may be performed by an example service configuration system 101, 200, 380 as shown and described with respect to FIGS. 1-3. Referring to FIG. 5, the service configuration system 101 can receive latency data from user devices (500). For examples discussed in connection with a transportation facilitation system 300, the latency data can be received from rider devices 385 (503) and/or driver devices 390 (504). As an example, the latency data may be received for a sampling of all devices (e.g., 5% of all devices), or a sampling of certain devices (e.g., driver devices 390) for each of a plurality of network service providers. Furthermore, the latency data can indicate one or more of RTT data (501) (i.e., response time indicating latency) and carrier data (502) indicating a particular network service provider used for each device.

The service configuration system 101 can then determine, from the RTT data for each device, whether the network latency is within an acceptable latency range (505). Thus, the service configuration system 101 determines whether the network latency for each device exceeds an upper or lower latency threshold (510). If the latency does not exceed a threshold (511), then the process can repeat by receiving a new set of latency data from user devices (500). However, if the latency does exceed a threshold (512), then the service configuration system 101 can identify the network carrier associated with the latency from the carrier data (515). For example, the service configuration system 101 can perform a lookup based on MCC and MNC data embedded in the latency data (e.g., originating from a ping response).

In various examples, the service configuration system 101 can determine whether an upper latency threshold or a lower latency threshold has been exceeded (520). In general, when the upper or lower latency threshold is exceeded, the service configuration system 101 can generate a configuration signal to adjust performance configurations in connection with the application service. For example, if a lower latency threshold has been exceeded (522), the service configuration system 101 can generate a configuration signal to boost the application performance by, for example, increasing data updates and/or the amount of data communicated from the selected devices (525) (e.g., devices using the deficient carrier network). Additionally or alternatively, the service configuration signal can generate the configuration signal to cause the transportation facilitation system 300 to increase a pool of available drivers for each receive pickup request when the network latency is below the lower threshold.

However, if the latency exceeds an upper latency threshold (521), then the service configuration system 101 can generate a configuration signal to compensate for the communication delay (530). For example, the service configuration system 101 can identify a number of backend properties that can be adjusted (531), and/or a number of service application properties that can be reconfigured (532). Specifically, the configuration signal can be generated to comprise service configurations 144 that decrease or cease transmissions of unnecessary data from the select devices. Additionally or alternatively, the service configurations 144 can cause the backend system 100 to adjust variables or performance configurations in the service application itself (e.g., timing features). Additionally or alternatively still, the service configuration system 101 can decrease a pool of available drivers for each received pickup request, or decrease a data transmission rate, when the network latency is above the upper threshold in order to decrease overall communications over the deficient carrier network In many examples, the service configuration system 101 can identify user devices that use the carrier network associated with the network latency (535). As an example, the service configuration system 101 can reference live session logs managed by the backend system 100 to determine all driver devices 390 that use the deficient network service provider(s). Optionally, the service configuration system 101 can also determine whether a hierarchical distribution of the configuration signal to certain devices using the carrier can cure the latency (540). For example, the service configuration system 101 can identify a severity of the network latency (541) (e.g., how far the latency is above or below the respective threshold), and/or determine various device statuses (542) to identify one or more hierarchical sets of user devices 185 that can be reconfigured without reconfiguring all devices.

For examples described in connection with the transportation facilitation system 300, the service configuration system 380 can identify low priority driver devices 390 based on their device status in the session logs 332. Such devices may have statuses ranging from an on-trip status to an offline status. Additionally or alternatively, the service configuration system 380 can generate the configuration signal such that all driver devices 390 using the deficient carrier only transmit data when a device status changes. As described herein, the backend transportation facilitation system 300 and the front end driver devices 390 can be reconfigured to transmit more or less data based on the detected network latency exceeding a lower or upper threshold respectively.

In accordance with various aspects, the service configuration system 101 can transmit the configuration signal to the backend system 100 and/or the selected user devices 185 to restrict or bolster data communications (545). Thereafter, the service configuration system 101 can monitor the select devices using the deficient carrier for signal latency (550). Thus, for each subsequent response or state update from those devices, the service configuration system 101 can determine whether the network latency for the deficient carrier has been resolved (555). If the latency has not been resolved (556), then the service configuration system 101 can continue to monitor the latency (550). However, if the signal latency has been resolved (557), then the service configuration system 101 can generate and transmit a configuration signal to restore the application configurations (e.g., back to default).

Examples described herein provide for dynamic determination of whether the network latency is within an acceptable latency threshold for each of a plurality of network service providers within a respective geographical region. Thus, service configuration system examples provided herein can dynamically generate and transmit configuration signals to backend systems or any number of user devices to compensate for the network latency when the network latency is not within the latency threshold.

Hardware Diagrams

Figure 6:
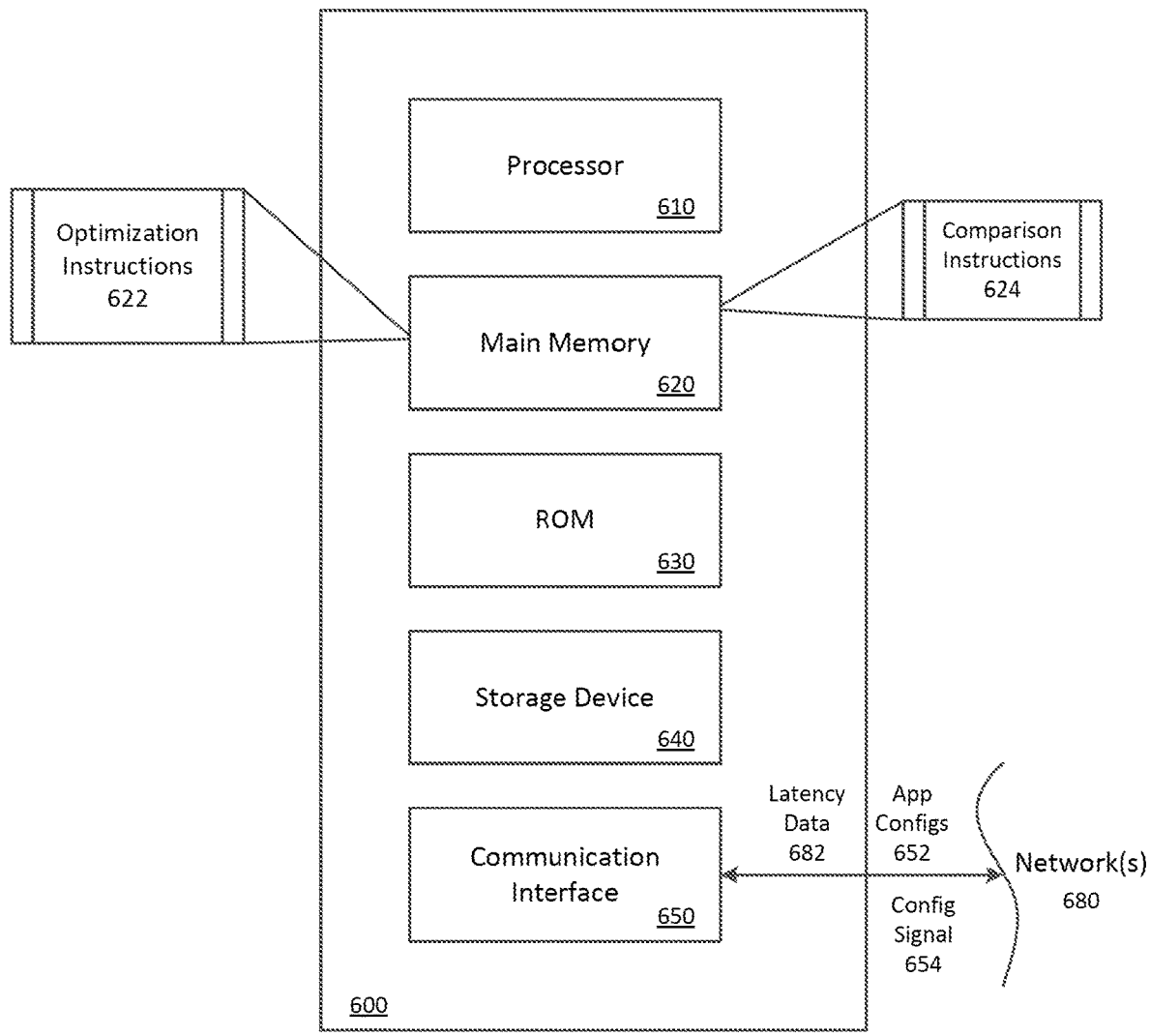
FIG. 6 is a block diagram that illustrates a computer system upon which examples described herein may be implemented.

FIG. 6 is a block diagram that illustrates a computer system upon which examples described herein may be implemented. A computer system 600 can be implemented on, for example, a server or combination of servers. For example, the computer system 600 may be implemented as part of an application configuration service executed over one or more networks. In the context of FIG. 1, the backend system 100 and service configuration system 101 may be implemented using a computer system 600 such as described by FIG. 6. The backend system 100 and service configuration system 101 may also be implemented using a combination of multiple computer systems as described in connection with FIG. 6.

In one implementation, the computer system 600 includes processing resources 610, a main memory 620, a read-only memory (ROM) 630, a storage device 640, and a communication interface 650. The computer system 600 includes at least one processor 610 for processing information stored in the main memory 620, such as provided by a random access memory (RAM) or other dynamic storage device, for storing information and instructions which are executable by the processor 610. The main memory 620 also may be used for storing temporary variables or other intermediate information during execution of instructions to be executed by the processor 610. The computer system 600 may also include the ROM 630 or other static storage device for storing static information and instructions for the processor 610. A storage device 640, such as a magnetic disk or optical disk, is provided for storing information and instructions.

The communication interface 650 enables the computer system 600 to communicate with one or more networks 680 (e.g., cellular network) through use of the network link (wireless or wired). Using the network link, the computer system 600 can communicate with one or more computing devices, and one or more servers. In accordance with examples, the computer system 600 receives latency data 682, comprising RTT data and carrier data, from computing devices of users. The executable instructions stored in the memory 630 can include optimization instructions 622, which the processor 610 executes to determine modifications to backend properties and application communication settings to compensate for the detected latency. The executable instructions stored in the memory 620 can also include comparison instructions 624, which enable the computer system 600 to compare the received RTT data with an acceptable latency range to determine whether the carrier latency is above and upper latency threshold or below a lower latency threshold, as described herein. By way of example, the instructions and data stored in the memory 620 can be executed by the processor 610 to implement an example service configuration system 101 of FIG. 1. In performing the operations, the processor 610 can receive latency data 682, and generate and transmit a configuration signal 654 comprising application service configurations 652 via the communication interface 650.

The processor 610 is configured with software and/or other logic to perform one or more processes, steps and other functions described with implementations, such as described in connection with FIGS. 1-5, and elsewhere in the present application.

Examples described herein are related to the use of the computer system 600 for implementing the techniques described herein. According to one example, those techniques are performed by the computer system 600 in response to the processor 610 executing one or more sequences of one or more instructions contained in the main memory 620. Such instructions may be read into the main memory 620 from another machine-readable medium, such as the storage device 640. Execution of the sequences of instructions contained in the main memory 620 causes the processor 610 to perform the process steps described herein. In alternative implementations, hard-wired circuitry may be used in place of or in combination with software instructions to implement examples described herein. Thus, the examples described are not limited to any specific combination of hardware circuitry and software.

Figure 7:
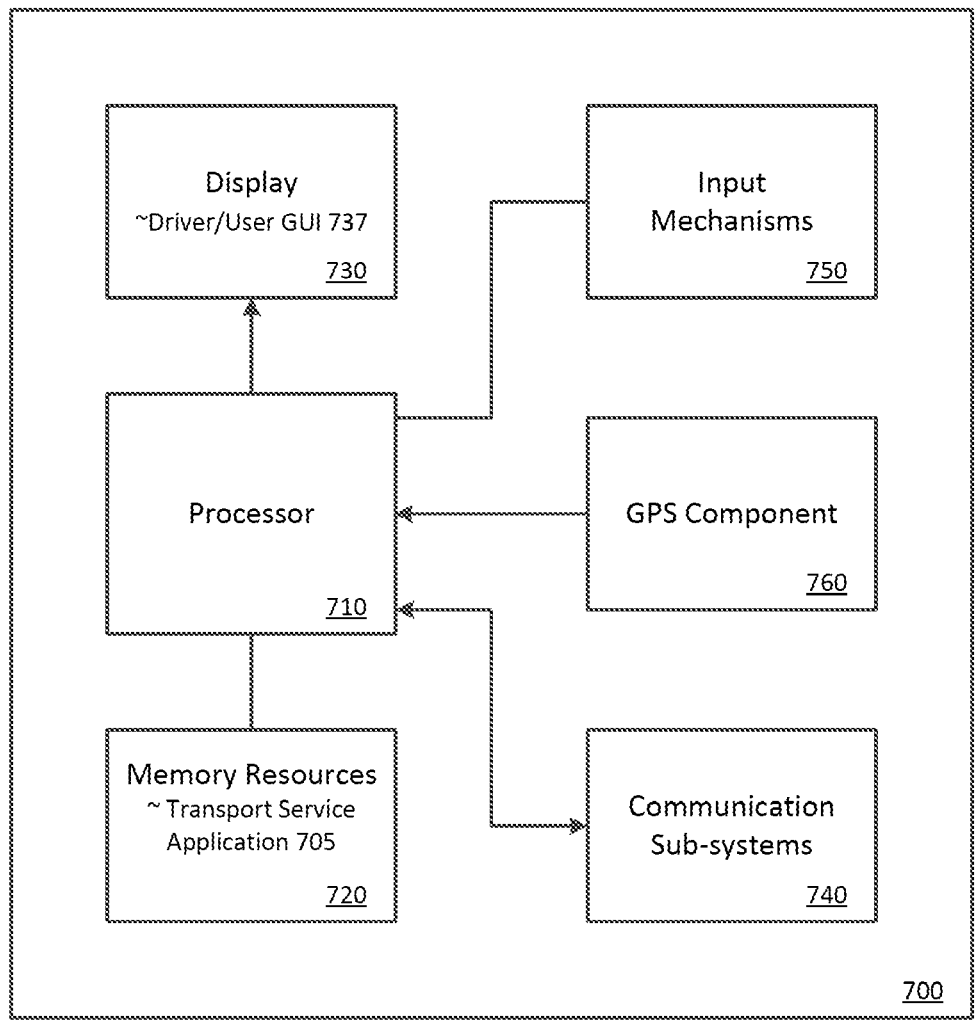
FIG. 7 is a block diagram that illustrates a computing device upon which examples described herein may be implemented.

FIG. 7 is a block diagram that illustrates a computing device upon which examples described herein may be implemented. In one example, a computing device 700 may correspond to, for example, a cellular communication device (e.g., feature phone, smartphone etc.) that is capable of telephony, messaging, and/or data services. In variations, the computing device 700 can correspond to, for example, a personal computer (PC), a tablet computer, or wearable computing device. Still further, the computing device 700 can be distributed amongst multiple users of an application service utilizing the backend application system 100 as described herein.

In an example of FIG. 7, the computing device 700 includes a processor 710, memory resources 720, a display device 730 (e.g., such as a touch-sensitive display device), one or more communication sub-systems 740 (including wireless communication sub-systems), input mechanisms 750 (e.g., a virtual or analog keyboard), and/or one or more location detection mechanisms (e.g., GPS component) 760. In one example, at least one of the communication sub-systems 740 sends and receives data over data channels and/or voice channels.

A user can operate the computing device 700 to enable or connect with the backend application system 100. The memory resources 720 can store a transportation services application 705 which can be executed by the processor 710 to cause a user GUI 737 to be generated on the display 730. User interaction with the GUI 737 can enable the user to trigger application responses, which enable the service configuration system 101 to identify network latency for each of a plurality of carrier networks, and thus generate configuration signals to compensate for the detected network latency.

While examples of FIG. 6 and FIG. 7 provide for a computer system 600 and computing device 700 for implementing aspects described, in some variations, the computing device 700 can operate to implement some or all of the functionality described with the backend application system 100 or service configuration system 101.

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A computing system implementing an application service, comprising:
   a network communication interface to communicate, over one or more networks, with a designated application executing on computing devices of clients of the application service;
   one or more processors; and
   one or more memory resources storing instructions that, when executed by the one or more processors, cause computing system to:
      receive, over the one or more networks, network data from the computing devices of the clients;
      determine, from the network data, that a network latency for a subset of the computing devices crosses an upper latency threshold;
      based on determining that the network latency for the subset of computing devices crosses upper the latency threshold, determine whether the subset of computing devices utilize a common network service provider; and
      based on determining that the subset of computing devices utilize the common network service provider, transmit, over the one or more networks, a set of configuration signals to the subset of computing devices, the set of configuration signals modifying a set of default application configurations of the designated application to compensate for the network latency.

2. The computing system of claim 1, wherein the set of configuration signals adjust a performance configuration for data communications between the application service and the subset of computing devices.

3. The computing system of claim 1, wherein the set of configuration signals cause the designated application to adjust an amount of data communicated to one or more backend computing systems.

4. The computing system of claim 1, wherein the application service comprises a transport service, and wherein the subset of computing devices comprises computing devices of drivers of the transport service.

5. The computing system of claim 4, wherein the designated application executing on each computing device of the subset (i) receives invitations to service pickup requests from the transport service, and (ii) enables a corresponding driver to accept or decline the invitations to service the pickup requests.

6. The computing system of claim 5, wherein the set of configuration signals cause the designated application executing on each of the subset of computing devices to decrease a duration of time to accept an invitation for a received pickup request when the network latency is above the upper latency threshold.

7. The computing system of claim 1, wherein the set of configuration signals cause the designated application to decrease a data transmission rate when the network latency is above the upper latency threshold.

8. A non-transitory computer readable medium storing instructions that, when executed by one or more processors of a computing system, cause the computing system to:
communicate, over one or more networks, with a designated application executing on computing devices of clients of an application service;
receive, over the one or more networks, network data from the computing devices of the clients;
determine, from the network data, that a network latency for a subset of the computing devices crosses an upper latency threshold;
based on determining that the network latency for the subset of computing devices crosses upper the latency threshold, determine whether the subset of computing devices utilize a common network service provider; and
based on determining that the subset of computing devices utilize the common network service provider, transmit, over the one or more networks, a set of configuration signals to the subset of computing devices, the set of configuration signals modifying a set of default application configurations of the designated application to compensate for the network latency.

9. The non-transitory computer readable medium of claim 8, wherein the set of configuration signals adjust a performance configuration for data communications between the application service and the subset of computing devices.

10. The non-transitory computer readable medium of claim 8, wherein the set of configuration signals cause the designated application to adjust an amount of data communicated to one or more backend computing systems.

11. The non-transitory computer readable medium of claim 8, wherein the application service comprises a transport service, and wherein the subset of computing devices comprises computing devices of drivers of the transport service.

12. The non-transitory computer readable medium of claim 11, wherein the designated application executing on each computing device of the subset (i) receives invitations to service pickup requests from the transport service, and (ii) enables a corresponding driver to accept or decline the invitations to service the pickup requests.

13. The non-transitory computer readable medium of claim 12, wherein the set of configuration signals cause the designated application executing on each of the subset of computing devices to decrease a duration of time to accept an invitation for a received pickup request when the network latency is above the upper latency threshold.

14. The non-transitory computer readable medium of claim 8, wherein the set of configuration signals cause the designated application to decrease a data transmission rate when the network latency is above the upper latency threshold.

15. A computer-implemented method of implementing an application service, the method being performed by one or more processors and comprising:
communicating, over one or more networks, with a designated application executing on computing devices of clients of the application service;
receiving, over the one or more networks, network data from the computing devices of the clients;
determining, from the network data, that a network latency for a subset of the computing devices crosses an upper latency threshold;
based on determining that the network latency for the subset of computing devices crosses upper the latency threshold, determining whether the subset of computing devices utilize a common network service provider; and
based on determining that the subset of computing devices utilize the common network service provider, transmitting, over the one or more networks, a set of configuration signals to the subset of computing devices, the set of configuration signals modifying a set of default application configurations of the designated application to compensate for the network latency.

16. The method of claim 15, wherein the set of configuration signals adjust a performance configuration for data communications between the application service and the subset of computing devices.

17. The method of claim 15, wherein the set of configuration signals cause the designated application to adjust an amount of data communicated to one or more backend computing systems.

18. The method of claim 15, wherein the application service comprises a transport service, and wherein the subset of computing devices comprises computing devices of drivers of the transport service.

19. The method of claim 18, wherein the designated application executing on each computing device of the subset (i) receives invitations to service pickup requests from the transport service, and (ii) enables a corresponding driver to accept or decline the invitations to service the pickup requests.

20. The method of claim 19, wherein the set of configuration signals cause the designated application executing on each of the subset of computing devices to decrease a duration of time to accept an invitation for a received pickup request when the network latency is above the upper latency threshold.

* * * * *